Feb. 25, 1964 S. E. TOWNSEND 3,122,735
ELECTRONIC SHAFT POSITION INDICATOR
HAVING ERROR CANCELLING MEANS
Filed Dec. 27, 1960

INVENTOR.
STEPHEN E. TOWNSEND
BY
ATTORNEY

United States Patent Office 3,122,735
Patented Feb. 25, 1964

3,122,735
ELECTRONIC SHAFT POSITION INDICATOR HAVING ERROR CANCELLING MEANS
Stephen E. Townsend, Rochester, N.Y., assignor to General Dynamics Corporation, Rochester, N.Y., a corporation of Delaware
Filed Dec. 27, 1960, Ser. No. 78,524
3 Claims. (Cl. 340—347)

This invention relates in general to computing apparatus and, more particularly, to electronic shaft position indicators having error cancelling means.

Although the invention herein disclosed has many applications, it is particularly adapted for use in computing apparatus. In such apparatus, it is often necessary to have precise information about the position of a rotating shaft. The information presented may be in the form of electrical pulses having digital significance about the angular position of the rotating shaft.

In the prior art, the position of a rotating shaft has been indicated by the combination of a photocell, a collimated light beam source directed towards the sensitive surface of the photocell, a slotted disc mechanically coupled to the rotating shaft positioned in cooperative relationship with the collimated light beam source and the photocell so that the disc intercepts the collimated light beam which would otherwise fall on the sensitive surface of the photocell and a pulse counting circuit electrically connected to the photocell. In operation, whenever the light beam passes through a slot in the disc, a photocell pulse is generated. The algebraic summation of pulses counted in the pulse counting circuit is a measure of the total angular rotation of the shaft from a reference position.

In United States Letters Patent No. 2,656,106, entitled "Shaft Position Indicator Having Reversible Counting Means," granted to Howard P. Stabler, October 20, 1953, there is disclosed apparatus to indicate shaft position regardless of change of direction in the rotation of the shaft. The apparatus disclosed therein comprises a slotted disc mounted on the shaft and two light sensitive phototubes with associated light sources which are so disposed about the disc to produce two series of pulse outputs as the shaft rotates. The two series of pulses are relatively displaced in time in accordance with the direction of the rotation of the shaft. Included further are a pulse generator responsive to the series of pulses from the light sensitive phototubes to produce direction sensitive in accordance with the direction of rotation of the shaft and a reversible counting circuit adapted to add and subtract the direction sensitive pulses. The number of counted direction sensitive pulses so recorded is a measure of the total angular motion of the shaft from an initial reference position.

From the foregoing discussion, it will be seen that although electronic shaft position indicators may differ from one another in many particulars, they are all characterized by the fact that they depend for their proper operation upon electrical pulses generated in response to the rotation of the shaft, and a counting circuit to record the number of pulses, the summation of which indicates the angular displacement from a given reference position. However, if pulses are lost or not generated, the counting circuit will have recorded an ambiguous summation. Even further, if spurious pulses are received at the counting circuit, a likewise ambiguous summation will result, which would not give the true angular position of the shaft. Since the electronic shaft position indicator may be utilized in a complex computing apparatus for controlling the sequence of operation of a plurality of circuits in the apparatus, it will be seen that an ambiguous recording by the shaft position indicator can be disastrous.

It is, therefore, an object of this invention to provide a new and improved electronic shaft position indicator.

It is a more particular object of this invention to provide a shaft position indicator which accurately indicates the angular displacement of a rotatable shaft from a reference position and automatically cancels accumulated errors introduced therein.

It is another object of this invention to provide a position indicating device for electrically indicating the position of a movable member traveling in a predetermined path from a reference position.

It is still another object of the present invention to provide a shaft position indicator for computing apparatus which is reliable and inexpensive to manufacture.

The present invention accomplishes the above cited objects by providing an electronic shaft position indicator comprising a coded disc, a photoelectric system for deriving electrical pulses in response to the rotation of the disc, and a counting circuit connected to the photoelectric system for scaling the pulses.

The disc is adapted to be mounted on a rotating shaft whose angular position is desired. The disc includes first, second and third concentric rings or tracks coaxially disposed around the shaft. The first track includes a first indicial slot centered about a given radius for indicating a first interval of angular displacement of the rotating shaft; the second track includes the first interval of angular displacement which is subdivided into $n$ first subintervals, where $n$ is a given integer at least equal to 2. The second track includes second indicial slots for indicating a displacement of the rotating shaft through each of the $n$ first subintervals. The third track includes the $n$ first subintervals which are further calibrated into $n$ second subintervals. Each $n$ second subinterval is indicated by a third indicial slot.

The photoelectric system includes a first, second and third photocell in registry with the first, second and third tracks, respectively, disposed on one side of the disc. Included further are first, second and third collimated light beam sources disposed on the other side of the disc and directed towards the first, second and third photocells, respectively. Thus, the disc intercepts the collimated light beam sources that would otherwise fall on the sensitive surfaces of the first, second and third photocells. Whenever a light beam passes through an indicial slot in the disc, a photocell signal pulse is generated. Hence, the first, second and third photocells derive first, second and third signal pulses in response to the first, second and third indicial slots intercepting the light beam source.

The counting circuit includes a most significant digital open-ended counting chain having a capacity of $n$, a least significant digital open-ended counting chain also having a capacity of $n$, a first means for resetting the most significant digital counting chain, a second means for resetting the least significant digital counting chain and a first and second AND gate.

The counting circuit may be traced from the third photocell to the least significant counting chain, whence the third pulses are counted. The $n$th third pulse is not only sent to the least significant counting chain, but is also sent to the second AND gate which is connected between the second photocell and the second reset means. A second pulse derived from the second photocell along with the $n$th third pulse energizes the second reset means which, in turn, clears the least significant counting chain and carries the second pulse to the most significant counting chain. The first and second photocells are connected to the first AND gate which is in series with the first reset means. When the $n$th second pulse and the first pulse are gated through the first AND gate, the first reset means is energized and the most significant counting chain is cleared.

If accumulated errors in the form of lost pulses or spurious pulses are received in the least significant counting chain, the second reset means automatically clears the least significant counting chain when it receives a second and third pulse. Likewise, an accumulated error in the most significant counting chain is automatically cancelled when a first and second pulse energizes the first reset means which resets the most significant counting chain.

Further objects and advantages of the invention will become apparent as the following description proceeds, and the features of novelty which characterize the invention will be pointed out in particularity in the claims annexed to and forming a part of this specification.

For a better understanding of the invention, reference may be had to the accompanying drawing which consists of three figures on a single sheet.

It is to be understood that only the details of the shaft position indicator necessary to understand the invention have been shown. For example, a shaft direction detector and reversible counting means have been omitted because such means are described in U.S. Letters Patent No. 2,656,106 granted to Howard P. Stabler, entitled "Shaft Position Indicator Having Reversible Counting Means" and forms no part of this invention.

Figure 1:
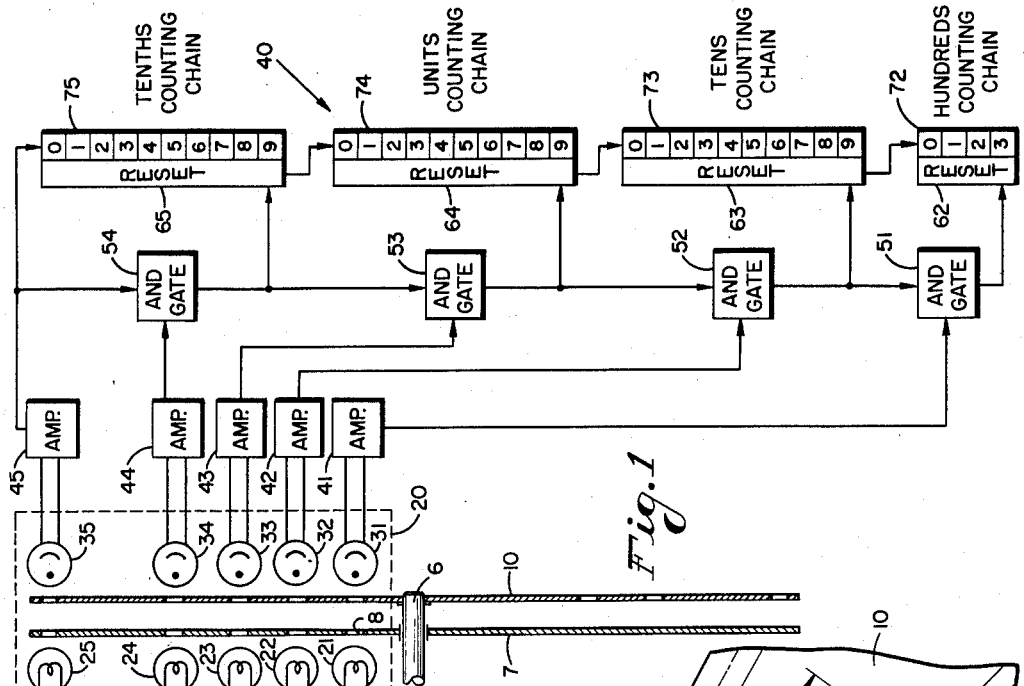
FIG. 1 is a block diagram illustrating one embodiment of the shaft position indicator in accordance with the principle of the invention, including a coded disc mounted on the shaft whose angular position is desired.
Figure 2:
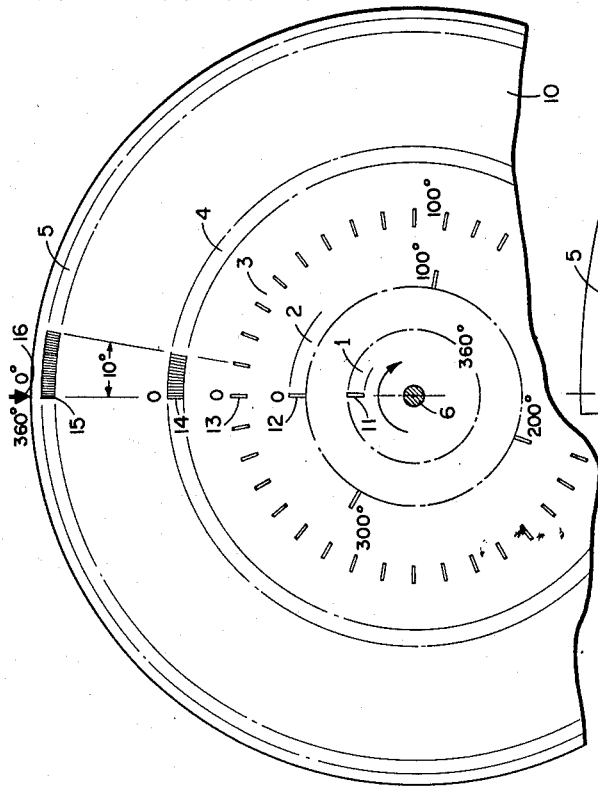
FIG. 2 shows a fragmentary plan view of the coded disc employed in FIG. 1.

Referring now to FIGS. 1 and 2 of the drawing, there is illustrated in schematic form a shaft position indicator constructed in accordance with a preferred embodiment of the invention for indicating by electrical pulses having digital significance the angular position of a rotating shaft 6. Conventionally, the angular position of the rotating shaft is indicated in one hundreds, tens, units and tenths of a degree. However, binary, radian or coded notation may be employed equally as well. The shaft position indicator comprises a coded disc 10 mounted on the shaft 6, a photoelectric system 20 for deriving electrical pulses in response to the rotation of the disc 10, and a counting circuit shown generally at 40 for scaling the electrical pulses.

The disc 10 is mechanically coupled to the shaft 6 in any well known manner to rotate in unison with the shaft 6. The disc 10 includes five concentric rings or tracks 1, 2, 3, 4 and 5 having opaque areas and indicial slots indicating intervals of angular displacement of the rotating shaft 6. The tracks 1, 2, 3, 4 and 5 are disposed coaxially about shaft 6, track 1 being the innermost track. The first track 1 includes one 360° reference indicial slot 11 concentrically disposed along a given radius 9 to indicate a 360° interval of displacement. The second track 2 is calibrated from the radius 9 to indicate one hundred degree intervals clockwise. Each one hundred degree interval is indicated by a one hundred degree indicial slot 12.

The third track 3 is calibrated from radius 9 to indicate ten degree intervals. Each ten degree interval is indicated by a ten degree indicial slot 13.

Figure 3:
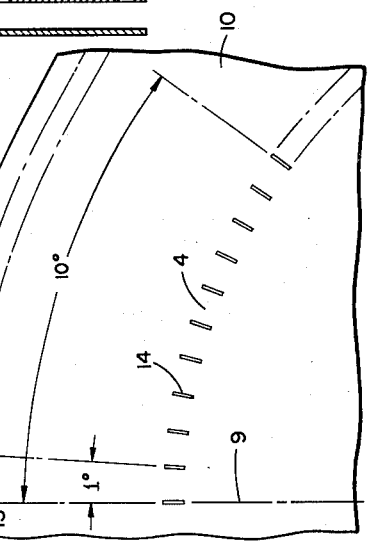
FIG. 3 illustrates a partial fragmentary plan view of the coded disc shown in FIG. 2, the details of which have been magnified.

The fourth track 4 is calibrated from radius 9 to indicate one degree intervals. Each one degree interval is indicated by a one degree indicial slot 14. The fifth track 5 is calibrated from radius 9 to indicate tenth of a degree intervals. Each tenth of a degree interval is indicated by a tenth of a degree indicial slot 15. At each one degree interval, a one degree indicial slot 15 and a tenth of a degree indicial slot 14 are centered along a given radius. The one degree indicial slot 14 may be made slightly wider than the tenth of a degree indicial slot 15, where alignment may be a problem. Likewise, each succeeding indicial slot, namely, indicial slot 13, may be made slightly wider than indicial slot 14 and indicial slot 12 may be made slightly wider than indicial slot 13 and indicial slot 11 is slightly wider than indicial slot 12. FIGURE 3 is an enlarged fragmentary view of the disc 10 showing the relative size of indicial slots 14 and 15. The indicial slots 11, 12, 13, 14 and 15 along radius 9 may be considered a reference index on disc 10. Shown at 16 is a stationary reference index.

The photoelectric system 20 includes photocells 31, 32, 33, 34 and 35, lamps 21, 22, 23, 24 and 25 aligned with the sensitive surface of photocells 31, 32, 33, 34 and 35, respectively, and lamp shield 7. Photocells 31, 32, 33, 34 and 35 are stationary and aligned along any given radius, coincident with the stationary reference index 16, thus establishing a given stationary reference position. Photocells 31, 32, 33, 34 and 35 are in registration with tracks 1, 2, 3, 4 and 5, respectively.

Lamp shield 7 includes five narrow slits 8 axially aligned with each photocell 31, 32, 33, 34 and 35 and lamps 21, 22, 23, 24 and 25 respectively to form collimated light beam sources. Lamp shield 7 is stationary and is mounted in any well known manner. The disc 10 is disposed between the photocells 31, 32, 33, 34 and 35 and the lamp shield 7, so that it intercepts the light ray beams that would otherwise fall on the sensitive surfaces of photocells 31, 32, 33, 34 and 35. Whenever a light beam passes through any one of the slots 11, 12, 13, 14, 15 in the disc 10, a photocell signal pulse is generated.

The counting circuit 40 includes amplifiers 41, 42, 43, 44 and 45 connected to photocells 31, 32, 33, 34 and 35, respectively, AND gates 51, 52, 53 and 54, pulse operated counting chains 72, 73, 74 and 75, and reset means 62, 63, 64 and 65 for resetting counting chains 72, 73, 74 and 75, respectively.

Suitable amplification of the photocell pulse is accomplished by amplifiers 41, 42, 43, 44 and 45 which may be triodes, pentodes or any other well known means.

AND gates 51, 52, 53 and 54 are devices whose output is energized only when energy input is in its prescribed state. Such devices are well known. They may comprise a T network of a capacitor, resistor and diode.

Pulse operated counting chains 72, 73, 74, and 75 are open-ended counting chains. In open-ended counting chains, the maximum number of pulses which can be counted is equal to the number of elements in the chain and, in order to start a new count, external reset means must be employed. Counting chains 73, 74 and 75 include ten elements shown simply as numerals zero through nine enclosed in adjacent rectangular enclosures. Counting chain 72 includes only four elements again shown simply as numerals zero through three enclosed in adjacent rectangular positions. Although the counting chains 72, 73, 74 and 75 shown are ordinarily scaling counters, reversible counters which account for both the addition and subtraction of pulses may be employed, as mentioned previously.

It is believed that the operation of the shaft position indicator can best be understood by tracing the photocell pulses generated by photocells 31, 32, 33, 34 and 35 through the counting circuit 40 when the shaft 6 is rotated. Assume that the disc 10 is turned until radius 9 which includes indicial slots 11, 12, 13, 14 and 15 is centered on photocells 31, 32, 33, 34 and 35, respectively, as indicated by index 16. In this position, a reference position, all the counting chains 72, 73, 74 and 75 are clear and ready for a new count. When the shaft is turned counterclockwise through each tenth of a degree, light rays from lamp 25 pass through slit 8 to indicial slot 15 onto the sensitive surface of photocell 35 which generates an electrical pulse. Photocell 35 pulse is suitably amplified by amplifier 45 and conducted to the tenth's counting chain 75 where it is recorded. Subsequent pulses from photocell 35 step the tenth's counting chain 75 sequentially through each of its elements or stages. The pulses from photocell 35 are also conducted to AND gate 54 but are not gated through since the pulse energy input is not at AND gate 54 prescribed state. AND gate 54 normally closed requires a pulse from photocells 34 and 35 to enable a pulse to pass through AND gate 54. A single pulse from either photocell 34 or 35 will not enable AND gate 54. The tenth pulse from photocell 35 is simultaneously applied to the tenth's counting chain 75 and to AND gate 54 where it is met by a pulse from photocell 34. The combined pulses having the necessary energy input are transmitted through AND gate 54 to reset means 65 which, in turn, resets counting chain 75 for a new counting cycle. Thus the reset means is operated only when AND gate 54 is enabled in response to the simultaneous application of a pulse from photocells 34 and 35. A pulse is generated from photocell 34 each time the shaft 6 is rotated a full degree while a pulse from photocell 35 is generated each time the shaft 6 is rotated one-tenth of a degree. The indicial slot 14 permits the light rays of lamp 25 to fall on the sensitive surface of photocell 34. Reset means 65 resets the tenth's counting chain 75 preparing it for a new count, as mentioned above, and carries the combined pulses to the units counting chain 74 where a first count is recorded. Thus, in accordance with the invention, a least significant counting chain is reset by a pulse from a most significant photocell 34 along with a pulse from photocell 35. Accumulative errors in the tenths counting chain 75 will be cancelled every one degree.

Likewise, when the shaft has been turned ten degrees, a pulse from photocell 33 is amplified by amplifier 43 and conducted to AND gate 53 where it is combined with the tenth pulse from photocell 34 and passed through AND gate 52 to reset means 64. The reset means 64 energized by the combined pulses of photocells 33 and 34 resets and clears the units counting chain 74 and carries the combined pulse to the tens counting chain 73. Thus, accumulative errors in the units counting chain 74 are cleared once every ten degrees.

When the shaft has been rotated through one hundred degrees, a pulse from photocell 32 is amplified by amplifier 42 and conducted to AND gate 52. Photocell 32 pulse, along with the photocell 33 pulse, is passed through AND gate 52 and energizes reset means 63. Reset means 63 resets the tens counting chain 73 for a new count and carries the pulse to the one hundred counting chain 72. The operation is repeated through each one hundred degree interval or until the presence of indicial slot 11. Accumulative errors in the tens counting chain 73 are cleared once every one hundred degrees.

When the shaft has completed a full revolution, the 360° indicial slot 11 permits light rays to fall on photocell 31, which generates a pulse. Photocell 31 pulse is amplified by amplifier 41, conducted to AND gate 51 where it combines with photocell 32 pulse. The combined pulses of photocell 31 and 32 are gated through AND gate 51 to reset means 62. Reset means 62 resets the one hundred counting chain 62 for a new counting cycle. It should be noted that we have now returned to the start position and all the counting chains 72, 73, 74 and 75 are cleared and ready for a new count.

Thus, even if the tenths counting chain 75 recorded spurious pulses beyond the proper number of pulses, the tenths counting chain 75 would not be reset or cleared until the reset means 65 received a combined pulse from the one degree photocell 34 and photocell 35 which is gated through AND gate 54. A pulse is generated by photocell 34 once for each degree of revolution. If a pulse is lost or not transmitted to the counting chain 75, the combined pulse from photocells 34 and 35 will energize the reset means 65 resetting the counting chain 75 for a new counting cycle. Hence, it can be seen that the rotation of the shaft 6 through ten of the tenth's of a degree, a one degree pulse from photocell 34 resets counting chain 75; also ten one degree rotations of the shaft, a ten degree pulse from photocell 33 resets counting chain 74. The tens counting chain 73 is likewise cleared for a new count when reset means 63 receives a pulse from photocell 32. Also, in accordance with the invention, the one hundreds counting chain 72 is cleared for a new count when reset means 62 receives a pulse from photocell 31. Accumulated errors are thus eliminated sequentially.

Although not shown, a pulse operated counting chain may be connected to amplifier 41 to record the pulses from photocell 31. The number of pulses so recorded would indicate the number of turns the shaft 6 has taken.

The preferred embodiment of the invention herein disclosed has employed photocells because no additional power is consumed by the shaft position indicator. However, brushes and commutators may also be used.

While there has been described what is at present considered to be the preferred embodiment of the invention, it will be obvious to those skilled in the art the various changes and modifications which may be made therein without departing from the invention, and it is aimed in the appended claims to cover all such changes and modifications as fall within the true spirit and scope of the invention.

What is claimed is:

1. In a device for indicating the position of a rotating shaft with respect to a reference position, the combination comprising, means coupled to said movable member including a first indicium for indicating a sector of angular displacement of said shaft from said reference position, said sector being divided into a plurality of subsectors, a corresponding plurality of second indicia for indicating corresponding displacement of said rotating shaft through each of said subsectors, said subsector being divided into a plurality of sub-subsectors, a corresponding plurality of third indicia for indicating corresponding angular displacement of said rotating shaft through each of said sub-subsector, first indicial sensing means for deriving a first electrical pulse in response to said shaft being rotated through said sector, second indicial sensing means for deriving a second electrical pulse in response to said shaft being rotated through any of said subsectors, third indicial sensing means for deriving a third electrical pulse in response to said shaft being rotated through any of said sub-subsectors, a sub-subsector counting chain having a counting capacity equivalent to said plurality of sub-subsectors in one of said subsectors, said sub-subsector counting chain being coupled to said third indicial sensing means for counting said third electrical pulses, reset means coupled to said second indicial sensing means and to said sub-subsector counting chain for resetting said sub-sub-counting chain in response to said second pulse, a subsector counting chain having a capacity equivalent to said subsectors in said sector, said subsector counting chain being coupled to said second indicial sensing means for counting said second electrical pulses, and reset means coupled to said first indicial sensing means and to said subsector counting chain for resetting subsector counting in response to said first pulse.

2. The device defined in claim 1 further including a sector counting chain coupled to said first indicial means for counting said first electrical pulses.

3. In a device for indicating the position of a rotating shaft with respect to a reference position, the combination comprising, means coupled to said movable member including a first indicium for indicating a sector of angular displacement of said shaft from said reference position, said sector being divided into a plurality of subsectors, a corresponding plurality of second indicia for indicating corresponding angular displacement of said rotating shaft through each of said subsectors, each of said subsectors being divided into a plurality of sub-subsectors, a corresponding plurality of third indicia for indicating corresponding angular displacement of said rotating shaft through each of said sub-subsectors, first indicial sensing means for deriving a first electrical pulse in response to said shaft being rotated through said sector, second indicial sensing means for deriving a second electrical pulse in response to said shaft being rotated through any of said subsectors, a third indicial sensing means for deriving a third electrical pulse in response to said shaft being rotated through any of said sub-subsectors, a sub-subsector counting chain having a counting capacity equivalent to said plurality of sub-subsectors in each of said subsectors, said sub-subsector counting chain being coupled to said third indicial sensing means for counting said third electrical pulses, a subsector AND gate having an output and two inputs connected to said second and third indicial sensing means, reset means connected to said output of said subsector AND gate and to said sub-subsector counting chain for resetting said sub-subcounting chain in response to said second and third electrical pulse inputs to said subsector AND gate, a subsector counting chain having a capacity equivalent to said plurality of indicia in each of said subsectors in said sector for counting said second electrical pulses, a sector AND gate having an output and two inputs connected to said first and second indicial sensing means, and reset means coupled to said output of said sector AND gate and to said subsector counting chain for resetting said subsector counting chain in response to said first and second electrical pulse inputs to said sector AND gate.

References Cited in the file of this patent
UNITED STATES PATENTS

| | | |
|---|---|---|
| 2,734,188 | Jacobs | Feb. 7, 1956 |
| 2,755,020 | Belcher | July 17, 1956 |
| 2,770,798 | Roth | Nov. 13, 1956 |

OTHER REFERENCES

E. M. Jones: Digits and Optics Team for Precision, Control Engineering, April 1956, pp. 107–109 relied on.